(12) United States Patent
Nagai et al.

(10) Patent No.: US 10,968,783 B2
(45) Date of Patent: Apr. 6, 2021

(54) THERMAL POWER GENERATION SYSTEM AND CONTROL METHOD FOR SAME

(71) Applicant: Mitsubishi Hitachi Power Systems, Ltd., Yokohama (JP)

(72) Inventors: Yoshinori Nagai, Yokohama (JP); Satoru Sugita, Yokohama (JP); Takanori Nakamoto, Yokohama (JP); Hiroyuki Nosaka, Yokohama (JP); Yoshinori Taguchi, Yokohama (JP); Jun Iwasaki, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 15/776,595

(22) PCT Filed: Feb. 21, 2017

(86) PCT No.: PCT/JP2017/006334
§ 371 (c)(1),
(2) Date: May 16, 2018

(87) PCT Pub. No.: WO2017/163717
PCT Pub. Date: Sep. 28, 2017

(65) Prior Publication Data
US 2018/0328231 A1 Nov. 15, 2018

(30) Foreign Application Priority Data
Mar. 25, 2016 (JP) .............................. JP2016-061214

(51) Int. Cl.
*F01K 9/02* (2006.01)
*F22D 1/12* (2006.01)
(Continued)

(52) U.S. Cl.
CPC .......... *F01K 9/023* (2013.01); *B01D 53/8631* (2013.01); *B01D 53/8665* (2013.01);
(Continued)

(58) Field of Classification Search
CPC . F01K 9/023; F01K 7/16; F01K 11/02; F22D 1/12; F22D 1/34; B01D 53/8631;
(Continued)

(56) References Cited

U.S. PATENT DOCUMENTS 7,615,200 B2 * 11/2009 Lin .................... B01D 53/8631
422/105
2001/0008066 A1 7/2001 Liebig
(Continued)

FOREIGN PATENT DOCUMENTS

CN 203784915 U 8/2014
EP 2942495 A1 11/2015
(Continued)

OTHER PUBLICATIONS

International Search Report dated May 23, 2017, issued in counterpart International Application No. PCT/JP2017/006334, with English translation (12 pages).
(Continued)

*Primary Examiner* — Shafiq Mian
(74) *Attorney, Agent, or Firm* — Westerman, Hattori, Daniels & Adrian, LLP

(57) ABSTRACT

A thermal power generation system includes: a boiler; at least one steam turbine; a generator; a condenser; at least one low-pressure feed water; a high-pressure feed water pump; at least one high-pressure feed water heater capable of heating water pumped by the high-pressure feed water pump by utilizing extracted steam; a catalyst device including at least one kind of catalyst capable of promoting reduction reaction of nitrogen oxide and oxidation reaction of metallic (Continued)

mercury, the nitrogen oxide and the metallic mercury both being contained in the exhaust gas; at least one mercuric oxide removing device capable of removing mercuric oxide produced by the oxidation reaction of the metallic mercury from the exhaust gas; and an exhaust gas temperature adjustment device capable of adjusting a temperature of the exhaust gas at the catalyst device, by adjusting heating of the water by the at least one high-pressure feed water heater.

7 Claims, 4 Drawing Sheets

(51) Int. Cl.
| | | |
|---|---|---|
| F22D 1/34 | (2006.01) | |
| F22D 1/32 | (2006.01) | |
| F01K 7/38 | (2006.01) | |
| F01K 7/22 | (2006.01) | |
| F01K 13/02 | (2006.01) | |
| F01K 7/40 | (2006.01) | |
| F01K 7/20 | (2006.01) | |
| F23J 15/00 | (2006.01) | |
| B01D 53/86 | (2006.01) | |
| F01K 11/02 | (2006.01) | |
| F01K 7/16 | (2006.01) | |

(52) U.S. Cl.
CPC ............ *B01D 53/8696* (2013.01); *F01K 7/20* (2013.01); *F01K 7/22* (2013.01); *F01K 7/38* (2013.01); *F01K 7/40* (2013.01); *F01K 11/02* (2013.01); *F01K 13/02* (2013.01); *F22D 1/12* (2013.01); *F22D 1/325* (2013.01); *F22D 1/34* (2013.01); *F23J 15/006* (2013.01); *B01D 2257/40* (2013.01); *B01D 2257/602* (2013.01); *B01D 2258/02* (2013.01); *B01D 2258/0283* (2013.01); *F01K 7/16* (2013.01); *F23J 2215/101* (2013.01); *F23J 2215/60* (2013.01); *F23J 2219/10* (2013.01)

(58) Field of Classification Search
CPC ............ B01D 2258/02; B01D 2257/40; B01D 2257/602
See application file for complete search history.

(56) References Cited

U.S. PATENT DOCUMENTS

| | | | | |
|---|---|---|---|---|
| 2002/0194849 | A1* | 12/2002 | Saviharju | F01K 3/247 60/670 |
| 2004/0238654 | A1* | 12/2004 | Hagen | F23C 99/003 237/12.1 |
| 2007/0140939 | A1 | 6/2007 | Obayashi et al. | |
| 2009/0071166 | A1* | 3/2009 | Hagen | F23C 6/02 60/775 |
| 2010/0212610 | A1* | 8/2010 | Harrison | F22D 1/40 122/421 |
| 2011/0002827 | A1* | 1/2011 | Ukai | B01D 53/501 423/239.1 |
| 2011/0076215 | A1* | 3/2011 | Abrams | B01D 53/8656 423/239.1 |
| 2012/0255303 | A1* | 10/2012 | Labbe | F01K 7/40 60/653 |
| 2012/0272649 | A1 | 11/2012 | Berndt et al. | |
| 2012/0324893 | A1* | 12/2012 | Hayashi | F22D 1/40 60/691 |
| 2013/0291983 | A1* | 11/2013 | Cohen | F22B 35/001 137/896 |
| 2016/0091197 | A1 | 3/2016 | Nagano et al. | |
| 2016/0169504 | A1 | 6/2016 | Uchida | |

FOREIGN PATENT DOCUMENTS

| | | |
|---|---|---|
| JP | 2587445 B2 | 3/1997 |
| JP | 2004-532373 A | 10/2004 |
| JP | 2007-167698 A | 7/2007 |
| JP | 2012-167918 A | 9/2012 |
| JP | 2012-189297 A | 10/2012 |
| JP | 2013-234838 A | 11/2013 |
| JP | 2014-149148 A | 8/2014 |
| WO | 2011/111450 A1 | 9/2011 |
| WO | 2014188790 A1 | 11/2014 |
| WO | 2015/041122 A1 | 3/2015 |

OTHER PUBLICATIONS

International Preliminary Report on Patentability (Form PCT/IB/338), issued in counterpart International Application No PCT/JP2017/006334 dated Oct. 4, 2018, with Form PCT/IB/373, PCT/ISA/237, PCT/IB/326, with English translation (17 pages).

Extended (Supplementary) European Search Report dated Oct. 14, 2019, issued in counterpart EP application No. 17769763.8. (8 pages).

Office Action dated Dec. 10, 2019, issued in counterpart JP application No. 2016-061214, with English translation. (7 pages).

Office Action dated Apr. 7, 2020, issued in counterpart JP Application No. 2016-061214, with English Translation. (8 pages).

* cited by examiner

THERMAL POWER GENERATION SYSTEM AND CONTROL METHOD FOR SAME

TECHNICAL FIELD

The present disclosure relates to a thermal power generation system and a method of controlling the same.

BACKGROUND ART

In recent years, techniques have been developed to reduce mercury concentration of exhaust gas discharged from a thermal power generation system.

For instance, Patent Document 1 discloses an exhaust-gas treatment apparatus including a cooling device disposed upstream of a denitration catalyst and configured to control the temperature of exhaust gas to a predetermined temperature of 300 to 400° C. Furthermore, exhaust gas controlled by a cooling device to have a predetermined temperature is guided to the denitration catalyst to reduce and remove nitrogen oxide in the exhaust gas, while metallic mercury in the exhaust gas is caused to react with hydrogen chloride to produce mercury chloride. A desulfurization apparatus disposed downstream of the denitration catalyst removes the mercury chloride from exhaust gas, by dissolving the mercury chloride into an absorbing solution. Accordingly, with the exhaust gas treatment device disclosed in Patent Document 1, it is possible to improve the efficiency of removing mercury from exhaust gas.

CITATION LIST

Patent Literature

Patent Document 1: JP2007-167698A

SUMMARY

Problems to be Solved

As disclosed in Patent Document 1, if the cooling device is disposed upstream of the denitration catalyst, it is possible to improve the efficiency of removing mercury from exhaust gas, but the configuration of the thermal power generation system becomes complex. Further, as the configuration of the thermal power generation system becomes complex, the efficiency of the entire system may deteriorate.

In view of the above, an object of at least one embodiment of the present invention is to provide a thermal power generation system and a method of controlling a thermal power generation system, whereby it is possible to adjust the temperature of exhaust gas at a catalyst device and remove metallic mercury from exhaust gas efficiently, with a simple configuration.

Solution to the Problems (1) A thermal power generation system according to at least one embodiment of the present invention includes: a boiler including at least one internal heat exchanger being disposed in a circulation passage through which water is circulatable, and being capable of generating steam through heat exchange between the water and exhaust gas produced by burning fuel; at least one steam turbine being disposed in the circulation passage and being capable of outputting power by utilizing the steam; a generator capable of generating electric power by utilizing the power outputted from the steam turbine; a condenser capable of condensing the steam discharged from the steam turbine; at least one low-pressure feed water heater being disposed in a feed water path forming a part of the circulation passage, extending from the condenser to the at least one internal heat exchanger, and being capable of heating the water condensed by the condenser by utilizing steam extracted from the at least one steam turbine; a high-pressure feed water pump being disposed in the feed water path of the circulation passage so as to be positioned downstream of the at least one low-pressure feed water heater, and being capable of increasing a pressure of the water heated by the at least one low-pressure feed water heater and pumping the water; at least one high-pressure feed water heater being disposed in the feed water path of the circulation passage so as to be positioned between the high-pressure feed water pump and the at least one internal heat exchanger, and being capable of heating the water pumped by the high-pressure feed water pump by utilizing steam extracted from the at least one steam turbine; a catalyst device being disposed in an exhaust path of the exhaust gas extending from the boiler, and including at least one kind of catalyst capable of promoting reduction reaction of nitrogen oxide and oxidation reaction of metallic mercury, the nitrogen oxide and the metallic mercury both being contained in the exhaust gas; at least one mercuric oxide removing device being disposed in the exhaust path so as to be positioned downstream of the catalyst device, and being capable of removing mercuric oxide produced by the oxidation reaction of the metallic mercury from the exhaust gas; and an exhaust gas temperature adjustment device capable of adjusting a temperature of the exhaust gas at the catalyst device, by adjusting heating of the water by the at least one high-pressure feed water heater.

With the above configuration (1), the exhaust gas temperature adjustment device is capable of adjusting the temperature of exhaust gas at the catalyst device by adjusting heating of water by the at least one high-pressure feed water heater. Thus, in the above configuration (1), it is possible to adjust the temperature of exhaust gas at the catalyst device, and remove metallic mercury from exhaust gas efficiently, with a simplified configuration.

(2) In some embodiments, in the above configuration (1), the exhaust gas temperature adjustment device includes: an exhaust gas temperature sensor capable of measuring the temperature of the exhaust gas at the catalyst device; at least one bypass passage disposed parallel to the feed water path so as to be capable of bypassing at least one of the at least one high-pressure feed water heater; at least one bypass valve capable of adjusting a flow rate of the water in the at least one bypass passage; and a control device configured to adjust an opening degree of the at least one bypass valve on the basis of a measurement result of the exhaust gas temperature sensor.

With the above configuration (2), the exhaust gas temperature adjustment device adjusts the opening degree of the at least one bypass valve on the basis of the measurement result of the exhaust gas temperature sensor, and thereby it is possible to adjust the temperature of exhaust gas at the catalyst device appropriately, and remove metallic mercury from exhaust gas efficiently.

(3) In some embodiments, in the above configuration (1) or (2), the exhaust gas temperature adjustment device includes: an exhaust gas temperature sensor capable of measuring the temperature of the exhaust gas at the catalyst device; at least one extraction valve disposed in at least one extraction passage extending between the at least one steam turbine and the at least one high-pressure feed water heater, and being capable of adjusting a flow rate of steam extracted from the at least one steam turbine; and a control device configured to adjust an opening degree of the at least one extraction valve on the basis of a measurement result of the exhaust gas temperature sensor.

With the above configuration (3), the exhaust gas temperature adjustment device adjusts the opening degree of the extraction valve on the basis of the measurement result of the exhaust gas temperature sensor, and thereby it is possible to adjust the temperature of exhaust gas at the catalyst device appropriately, and remove metallic mercury from exhaust gas efficiently.

(4) In some embodiments, in any one of the above configurations (1) to (3), the fuel is lignite, and the exhaust gas temperature adjustment device is configured to adjust the temperature of the exhaust gas at the catalyst device to be not higher than 420° C., or more preferably, not higher than 400° C.

Of the thermal power generation system, particularly in a coal burning thermal power generation system that uses lignite, dirt mainly composed of oxides of alkali metal and alkali earths abundantly contained in lignite adheres to the surface of the internal heat exchanger of the boiler, and the heat exchange rate at the internal heat exchanger of the boiler tends to decrease with time, which leads to a gradual increase in the exhaust gas temperature. Thus, in a coal burning thermal power generation system using lignite, the temperature of exhaust gas at the catalyst device exceeds 420° C. as the operation time advances. The chemical equilibrium between metallic mercury and mercuric oxide has temperature dependency. If the temperature of exhaust gas exceeds 420° C., the chemical equilibrium changes and the proportion of metallic mercury to the entire mercury increases. Furthermore, metallic mercury has a higher vapor pressure than that of mercuric oxide. An increase in the proportion of metallic mercury leads to deterioration of the efficiency of removing mercury from exhaust gas.

In this regard, with the above configuration (4), the exhaust gas temperature adjustment device is configured to adjust the temperature of exhaust gas at the catalyst device to 420° C. or below, and thus it is possible to maintain the chemical equilibrium between metallic mercury and mercuric oxide in a state where the proportion of metallic mercury is relatively small, which makes it possible to remove mercury from exhaust gas reliably and efficiently.

(5) In some embodiments, in any one of the above configurations (1) to (4), the exhaust gas temperature adjustment device is configured to adjust the temperature of the exhaust gas at the catalyst device to be not lower than 290° C., or more preferably, not lower than 320° C.

The reduction reaction of nitrogen oxide proceeds smoothly when the temperature of exhaust gas at the catalyst device is 290° C. or higher, or more preferably, 320° C. or higher. In contrast, if the temperature of exhaust gas is lower than 320° C., depending on the concentration of SOx in exhaust gas or concentration of $NH_3$ injected to achieve the necessary denitration function, acidic ammonium sulfate may be deposited on the catalyst, which may lead to reduction of the activity of the catalyst. When the activity of the catalyst becomes lower, the oxidization reaction of mercury may fail to proceed smoothly.

In this regard, with the above configuration (5), the exhaust gas temperature adjustment device is configured to adjust the temperature of exhaust gas at the catalyst device to 290° C. or higher, or preferably, 320° C. or higher, and thus it is possible to remove nitrogen oxide from exhaust gas reliably and efficiently, and remove metallic mercury from exhaust gas reliably and efficiently.

(6) In some embodiments, in any one of the above configurations (1) to (5), the thermal power generation system further includes an oxidizing agent supply device capable of supplying halogen to be used in the oxidation reaction of the metallic mercury to the catalyst device.

With the above configuration (6), even if the concentration of hydrogen chloride in exhaust gas is low, by supplying halogen to the catalyst device with the oxidizing agent supply device, it is possible to react the metallic mercury with the halogen to produce mercuric oxide, and remove mercury from exhaust gas reliably and efficiently.

(7) A method of controlling a thermal power generation system according to at least one embodiment of the present invention is for a thermal power generation system which includes: a boiler including at least one internal heat exchanger being disposed in a circulation passage through which water is circulatable, and being capable of generating steam through heat exchange between the water and exhaust gas produced by burning fuel; at least one steam turbine being disposed in the circulation passage and being capable of outputting power by utilizing the steam; a generator capable of generating electric power by utilizing the power outputted from the steam turbine; a condenser capable of condensing the steam discharged from the steam turbine; at least one low-pressure feed water heater being disposed in a feed water path forming a part of the circulation passage, extending from the condenser to the at least one internal heat exchanger, and being capable of heating the water condensed by the condenser by utilizing steam extracted from the at least one steam turbine; a high-pressure feed water pump being disposed in the feed water path of the circulation passage so as to be positioned downstream of the at least one low-pressure feed water heater, and being capable of increasing a pressure of the water heated by the at least one low-pressure feed water heater and pumping the water; at least one high-pressure feed water heater being disposed in the feed water path of the circulation passage so as to be positioned between the high-pressure feed water pump and the at least one internal heat exchanger, and being capable of heating the water pumped by the high-pressure feed water pump by utilizing steam extracted by the at least one steam turbine; a catalyst device being disposed in an exhaust path of the exhaust gas extending from the boiler, and including at least one kind of catalyst capable of promoting reduction reaction of nitrogen oxide and oxidation reaction of metallic mercury, the nitrogen oxide and the metallic mercury both being contained in the exhaust gas; and at least one mercuric oxide removing device being disposed in the exhaust path so as to be positioned downstream of the catalyst device, and being capable of removing mercuric oxide produced by the oxidation reaction of the metallic mercury from the exhaust gas, and the method includes: a step of adjusting a temperature of the exhaust gas at the catalyst device, by adjusting heating of the water by the at least one high-pressure feed water heater.

With the above configuration (7), in the exhaust gas temperature adjustment step, it is possible to adjust the temperature of exhaust gas at the catalyst device by adjusting heating of water by the at least one high-pressure feed water heater. Thus, with the above configuration (7), it is possible to adjust the temperature of exhaust gas at the catalyst device, and remove metallic mercury from exhaust gas efficiently, with a simplified configuration.

Advantageous Effects

According to at least one embodiment of the present invention, it is possible to provide a thermal power generation system and a method of controlling a thermal power generation system, capable of adjusting the temperature of exhaust gas with a catalyst device and removing metallic mercury from exhaust gas efficiently, with a simplified configuration.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
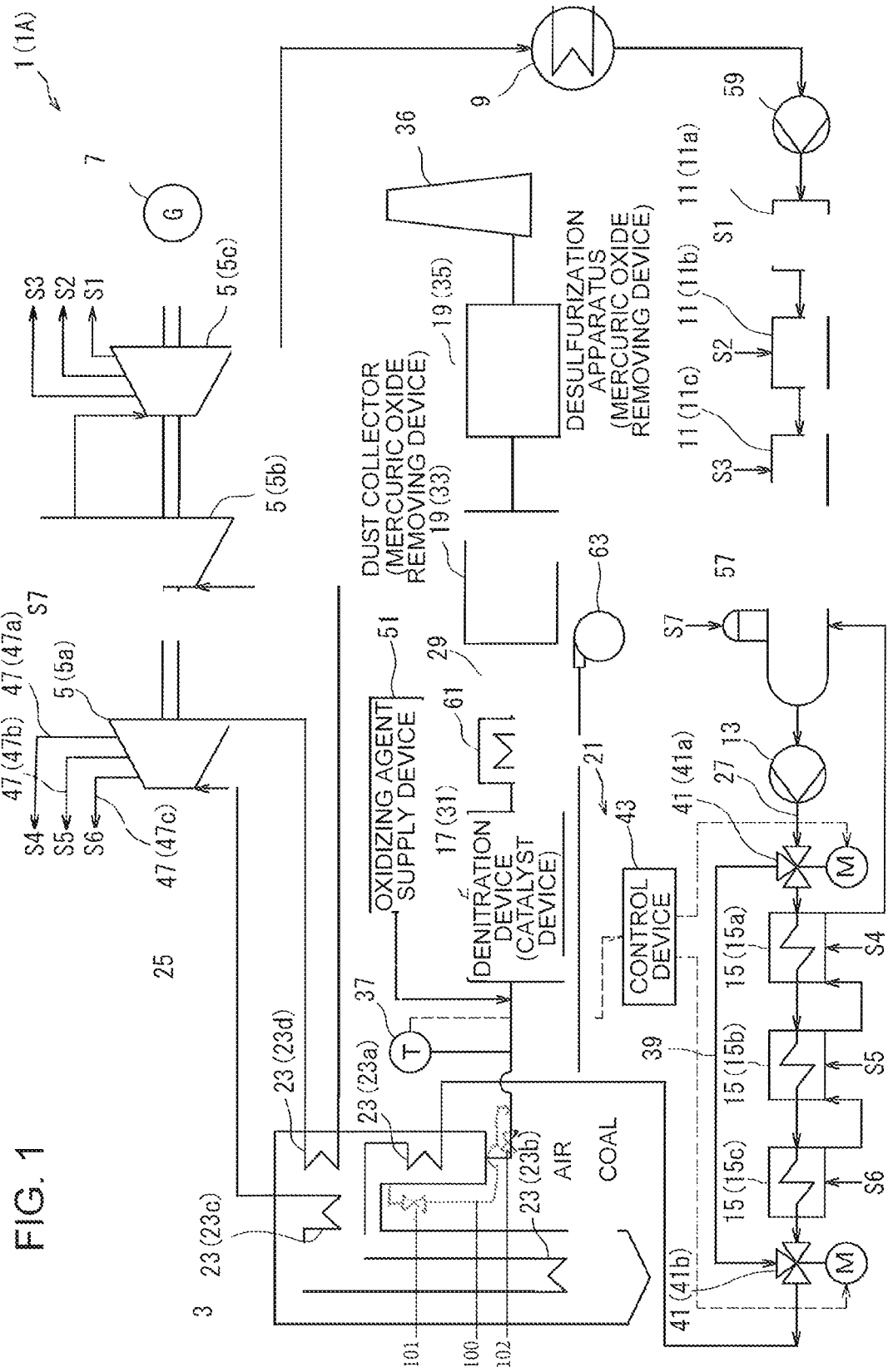
FIG. 1 is a schematic diagram of a thermal power generation system according to an embodiment of the present invention.
Figure 2:
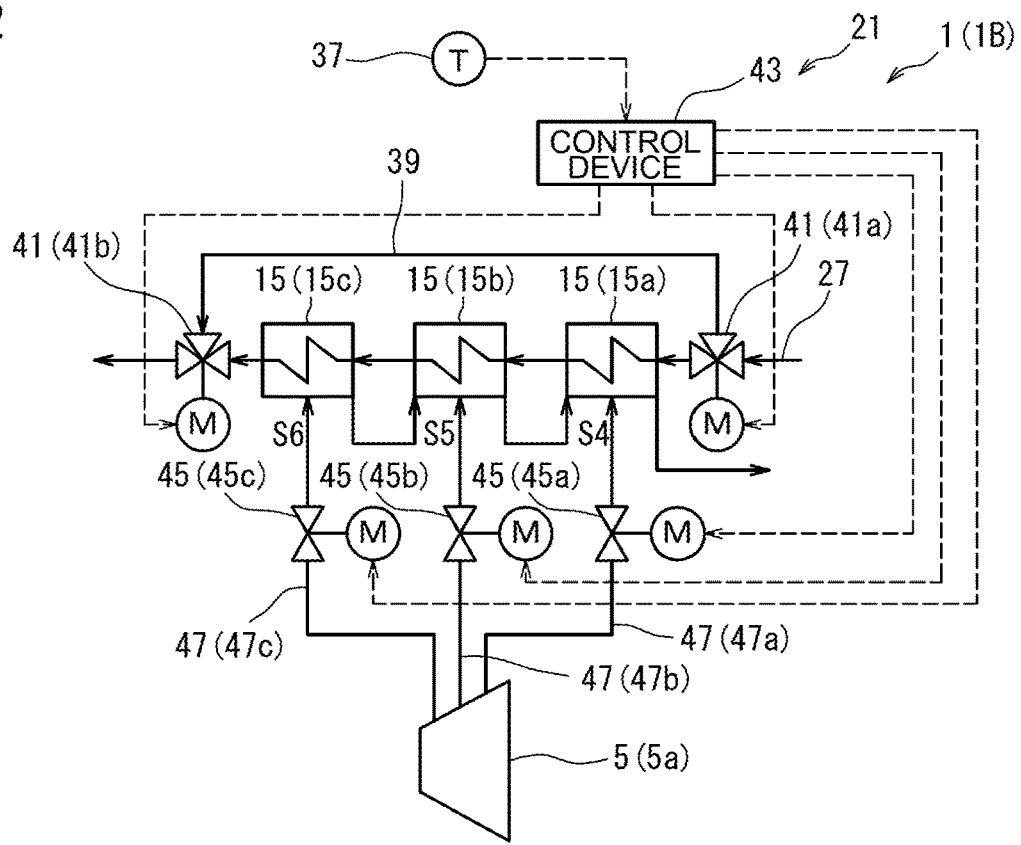
FIG. 2 is a schematic partial diagram of a configuration of a thermal power generation system according to another embodiment of the present invention.
Figure 3:
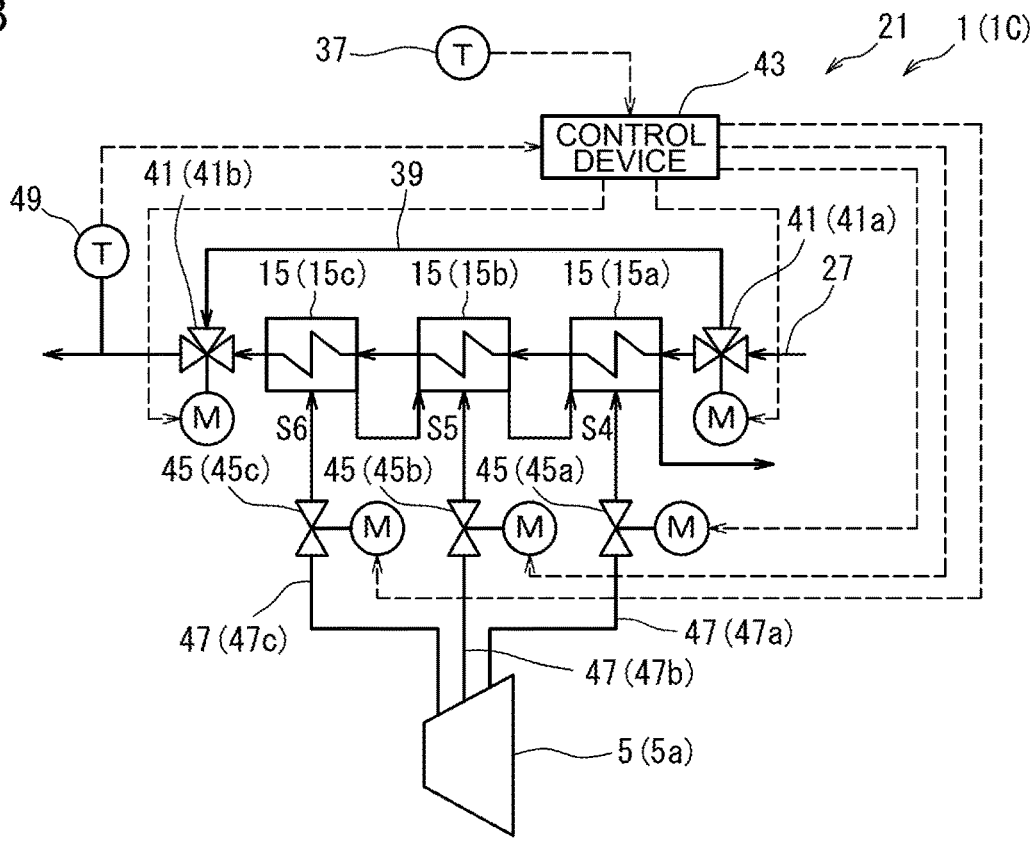
FIG. 3 is a schematic partial diagram of a configuration of a thermal power generation system according to yet another embodiment of the present invention.
Figure 4:
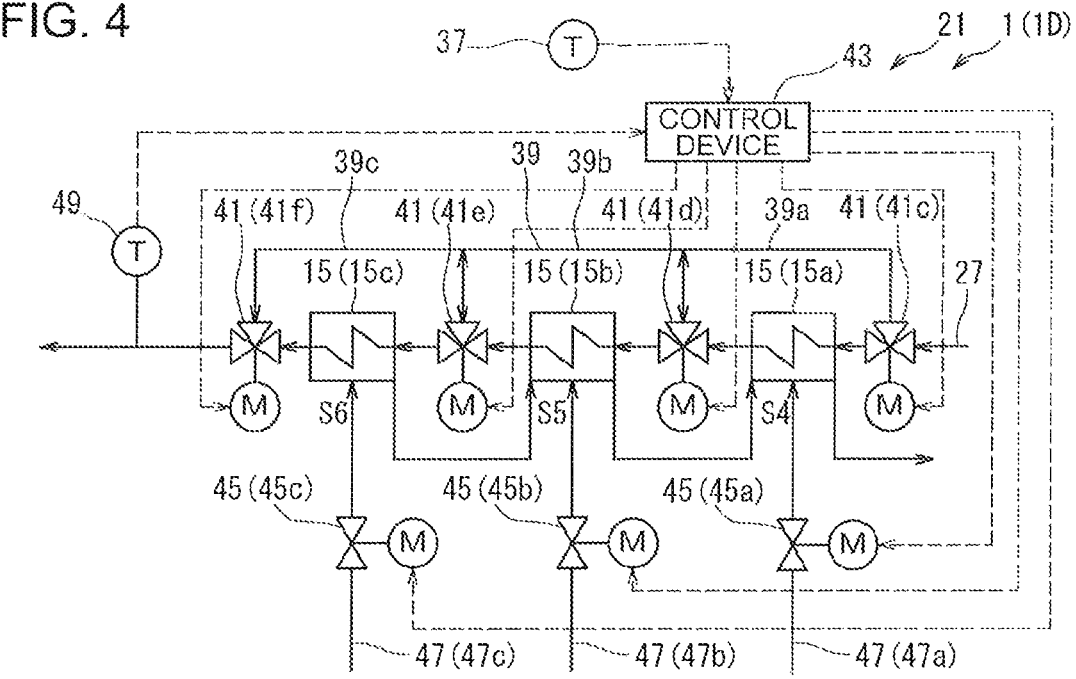
FIG. 4 is a schematic partial diagram of a configuration of a thermal power generation system according to yet another embodiment of the present invention.
Figure 5:
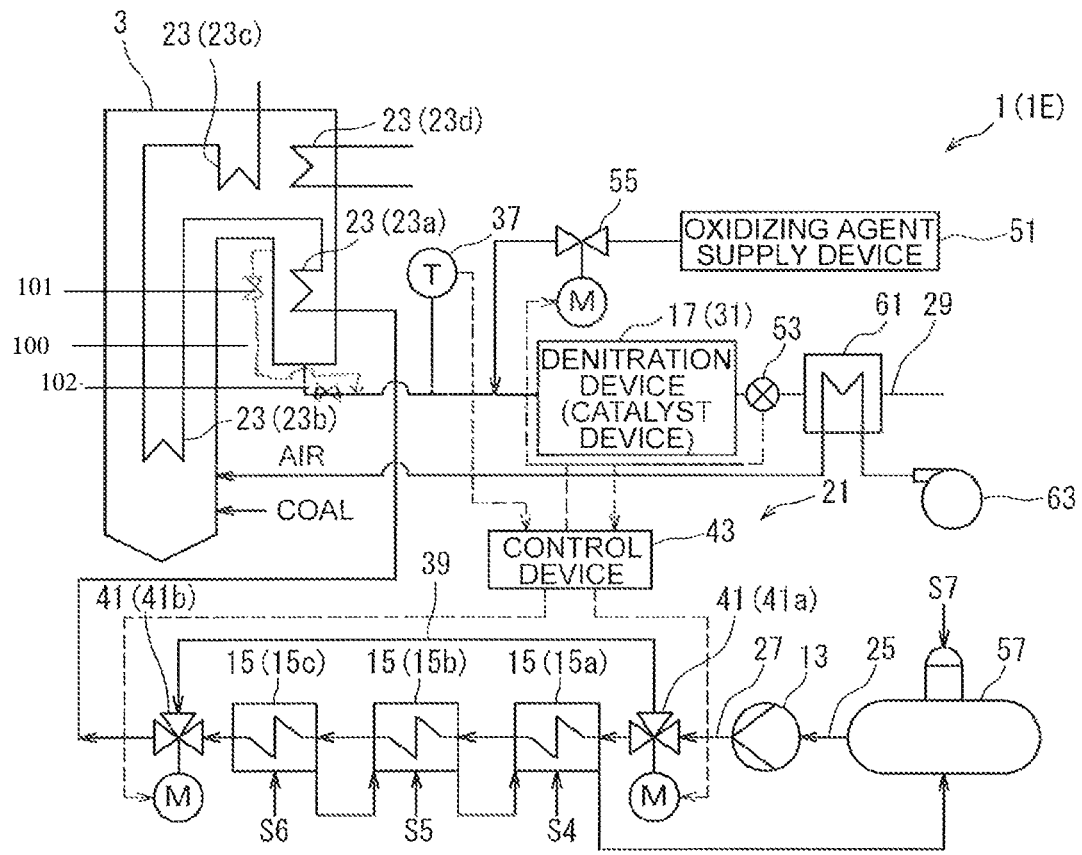
FIG. 5 is a schematic partial diagram of a configuration of a thermal power generation system according to yet another embodiment of the present invention.

FIG. 1 is a schematic diagram of a thermal power generation system 1A according to an embodiment of the present invention. FIG. 2 is a schematic partial diagram of a configuration of a thermal power generation system 1B according to another embodiment of the present invention. FIG. 3 is a schematic partial diagram of a configuration of a thermal power generation system 1C according to yet another embodiment of the present invention. FIG. 4 is a schematic partial diagram of a configuration of a thermal power generation system 1D according to yet another embodiment of the present invention. FIG. 5 is a schematic partial diagram of a configuration of a thermal power generation system 1E according to yet another embodiment of the present invention.

In the following description, thermal power generation systems 1A to 1E may be referred to as a thermal power generation system 1, collectively.

As shown in FIG. 1, the thermal power generation system 1 includes a boiler 3, at least one steam turbine 5, a generator 7, a condenser 9, at least one low-pressure feed water heater 11, a high-pressure feed water pump 13, at least one high-pressure feed water heater 15, a catalyst device 17, a mercuric oxide removing device 19, and an exhaust gas temperature adjustment device 21.

The boiler 3 is capable of producing high-temperature combustion gas (exhaust gas) by combusting fuel such as coal by utilizing air. The boiler 3 includes at least one internal heat exchanger 23, which is disposed in a circulation passage 25 through which water can circulate. The at least one internal heat exchanger 23 is capable of exchanging heat between exhaust gas and water, and of producing steam through heat exchange between water and exhaust gas produced by combusting fuel. For instance, as shown in FIG. 1, the at least one internal heat exchanger 23 includes an economizer 23a, an evaporator (evaporating tube) 23b, a super-heater 23c, and a re-heater 23d. The economizer 23a, the evaporator 23b, the super-heater 23c, and the re-heater 23d are disposed in the circulation passage 25 in the flow direction of water (circulation direction).

At least one steam turbine 5 is disposed in the circulation passage 25, and is capable of outputting power by utilizing steam. For instance, as shown in FIG. 1, the at least one steam turbine 5 includes a high-pressure turbine 5a, an intermediate-pressure turbine 5b, and a low-pressure turbine 5c. The high-pressure turbine 5a, the intermediate-pressure turbine 5b, and the low-pressure turbine 5c are disposed in the circulation passage 25 in this order in the flow direction of water (circulation direction). The high-pressure turbine 5a is disposed downstream of the super-heater 23c. The re-heater 23d is disposed between the high-pressure turbine 5a and the intermediate-pressure turbine 5b.

The generator 7 is coupled to the at least one steam turbine 5, and is capable of generating electric power by utilizing power outputted from the steam turbine 5.

The condenser 9 is capable of condensing steam discharged from the at least one steam turbine 5.

The at least one low-pressure feed water heater 11 is disposed in a feed water path 27 forming a part of the circulation passage 25. The feed water path 27 extends between the condenser 9 and the at least one internal heat exchanger 23, and is for supplying liquid-phase water to the internal heat exchanger 23.

The at least one low-pressure feed water heater 11 is capable of heating water condensed by the condenser 9, by utilizing steam extracted from the steam turbine 5. The number of low-pressure feed water heater 11 is not particularly limited. For instance, as shown in FIG. 1, the low-pressure feed water heater 11 may include the first low-pressure feed water heater 11a, the second low-pressure feed water heater 11b, and the third low-pressure feed water heater 11c. The first low-pressure feed water heater 11a, the second low-pressure feed water heater 11b, and the third low-pressure feed water heater 11c may be supplied with steam S1, S2, S3, respectively, extracted from the low-pressure turbine 5c, for instance. For instance, the at least one low-pressure feed water heater 11 is a mixing type feed water heater, in which water flowing through the feed water path 27 and steam supplied to heat water are mixed.

The high-pressure feed water pump 13 is disposed in the feed water path 27 of the circulation passage 25, and is positioned downstream of the low-pressure feed water heater 11 in the flow direction of water (circulation direction). The high-pressure feed water pump 13 is capable of increasing the pressure of water heated by the low-pressure feed water heater 11 to pump the water.

The at least one high-pressure feed water heater 15 is disposed in the feed water path 27 of the circulation passage 25, and is positioned between the high-pressure feed water pump 13 and the at least one internal heat exchanger 23. The high-pressure feed water heater 15 is capable of heating water pumped by the high-pressure feed water pump 13, by utilizing steam extracted from the at least one steam turbine 5. The number of high-pressure feed water heater 15 is not particularly limited. For instance, as shown in FIG. 1, the high-pressure feed water heater 15 may include the first high-pressure feed water heater 15a, the second high-pressure feed water heater 15b, and the third high-pressure feed water heater 15c. The first high-pressure feed water heater 15a, the second high-pressure feed water heater 15b, and the third high-pressure feed water heater 15c may be supplied with steam S4, S5, S6, respectively, extracted from the high-pressure turbine 5a, for instance. For instance, the at least one high-pressure feed water heater 15 is a surface-type feed water heater, in which water flowing through the feed water path 27 and steam supplied to heat water are not mixed.

The catalyst device 17 is disposed in the exhaust path 29 of exhaust gas extending from the boiler 3. As shown in FIG. 1, for instance, the catalyst device 17 includes a denitration device (selective catalytic reduction device; SCR) 31.

The exhaust path 29 is a path for discharging exhaust gas after heat exchange with the at least one internal heat exchanger 23 of the boiler 3. The exhaust gas after heat exchange with the at least one internal heat exchanger 23 contains nitrogen oxide and metallic mercury.

The catalyst device 17 includes at least one kind of catalyst. The at least one kind of catalyst is capable of promoting reduction reaction of nitrogen oxide and oxidation reaction of metallic mercury, each contained in exhaust gas.

Although not shown, the at least one kind of catalyst is supported by a carrier.

The catalyst is not particularly limited as long as it is capable of promoting reduction reaction of nitrogen oxide and oxidation reaction of metallic mercury. For example, it is possible to use, as a catalyst, a metallic oxide of V (vanadium), W (tungsten), Mo (molybdenum), Ni (nickel), Co (cobalt), Fe (iron), Cr (chromium), Mn (manganese), Cu (copper) or the like, or sulfate, or a noble metal such as Pt (platinum), Ru (ruthenium), Rh (rhodium), Pd (palladium), Ir (iridium), or the like, a mixture thereof can be used. Furthermore, for example, as a carrier, titania, silica, zirconia and a composite oxide thereof, or zeolite can be used.

Further, for example, as a catalyst, a composition containing an oxide of Ti (titanium), Mo and/or W, V, and Bi (bismuth) and having an atomic ratio Ti:(Mo+W):V=75-98.9:1-15:0.1-10, and an atomic ratio B/(Mo+W)=0.1-0.8 can be used.

Furthermore, for example, as a catalyst, a composition containing an oxide of each of Ti, Mo and/or W, V and P (phosphorus) and having an atomic ratio Ti:(Mo+W):V=85-97.5:2-10:0.5-10, and an atomic ratio P/(Mo+W+V)=0.5-1.5 can be used.

Furthermore, for example, as a catalyst, a catalyst containing titanium oxide as a main component, and an oxide of at least one kind of element selected from the group consisting of W, Mo and V as an active component, and further containing phosphoric acid or a water-soluble phosphoric acid compound so that the atomic ratio of phosphorus to the active component is greater than zero and not greater than 1.0 can be used. In this catalyst, the following expression is satisfied: 0<P/active component (atomic ratio)=P mole number/(W mole number+Mo mole number+V mole number) ≤1.0.

Further, for example, as a catalyst, a catalyst containing titanium oxide being in contact with phosphoric acid or ammonium phosphate salt in an amount of more than 1 and not more than 15 weight % with respect to titanium oxide in the presence of water, the titanium oxide having phosphate ions adsorbed to the surface of the titanium oxide and supporting an oxo acid or oxo acid salt of Mo and/or W and an oxo acid salt or vanadyl salt of V in an amount of more than 0 and not more than 8 atom % can be used. Further, for example, as a catalyst, a catalyst containing $TiO_2$ as a carrier, supporting $V_2O_5$ and $MoO_3$ on the carrier as active components, and supporting at least one type of element of compound selected from the group consisting of W, Cu, Co, Ni, and Zn (zinc), and compounds thereof can be used.

The at least one mercuric oxide removing device 19 is positioned downstream of the catalyst device 17 and disposed in the exhaust path 29, and is capable of removing mercuric oxide produced by oxidation reaction of metallic mercury from exhaust gas. For instance, as shown in FIG. 1, the mercuric oxide removing device 19 includes a dust collector 33 and a wet-type desulfurization apparatus 35. The dust collector 33 removes mercuric oxide from exhaust gas, along with ash. In the desulfurization apparatus 35, mercuric oxide dissolves into an absorbing solution, thus the mercuric oxide is removed from exhaust gas. The exhaust path 29 extends to a stack 36 arranged downstream of the desulfurization apparatus 35, and exhaust gas deprived of mercury is released from the stack 36 into atmosphere.

Then, in the thermal power generation system 1, the exhaust gas temperature adjustment device 21 is capable of adjusting the temperature of exhaust gas at the catalyst device 17 by adjusting heating of water by the at least one high-pressure feed water heater 15.

With the thermal power generation system 1 having the above configuration, the exhaust gas temperature adjustment device 21 is capable of adjusting the temperature of exhaust gas at the catalyst device 17 by adjusting heating of water by the at least one high-pressure feed water heater 15. Thus, in the above configuration, it is possible to adjust the temperature of exhaust gas at the catalyst device 17, and remove metallic mercury from exhaust gas efficiently, with a simplified configuration.

In some embodiments, as shown in FIGS. 1 to 5, the exhaust gas temperature adjustment device 21 includes an exhaust gas temperature sensor 37, at least one bypass passage 39, at least one bypass valve 41, and a control device 43.

The exhaust gas temperature sensor 37 is capable of measuring the temperature of exhaust gas of the catalyst device 17. As long as the exhaust gas temperature sensor 37 is capable of measuring the temperature of exhaust gas of the catalyst device 17, the exhaust gas temperature sensor 37 may be positioned upstream or downstream of the catalyst device 17 in the flow direction of exhaust gas.

The at least one bypass passage 39 is disposed in parallel to the feed water path 27 so as to be capable of bypassing at least one of the at least one high-pressure feed water heater 15.

The at least one bypass valve 41 is capable of adjusting the flow rate of water in the at least one bypass passage 39.

The control device 43 includes a computer, for instance, and is configured to adjust the opening degree of the at least one bypass valve 41 on the basis of the measurement result of the exhaust gas temperature sensor 37.

According to the thermal power generation system 1 having the above configuration, the control device 43 of the exhaust gas temperature adjustment device 21 is capable of adjusting the opening degree of the at least one bypass valve 41 on the basis of the measurement result of the exhaust gas temperature sensor 37. Thus, with a simplified configuration, it is possible to adjust the temperature of exhaust gas at the catalyst device 17 appropriately, and remove metallic mercury from exhaust gas efficiently.

As the flow rate of water flowing through the bypass passage 39 increases, the temperature of water supplied to the internal heat exchanger 23 decreases, and it is possible to decrease the temperature of exhaust gas at the catalyst device 17. On the other hand, as the flow rate of water flowing through the bypass passage 39 decreases, the temperature of water supplied to the internal heat exchanger 23 increases, and it is possible to increase the temperature of exhaust gas at the catalyst device 17.

In some embodiments, as shown in FIGS. 1, 2, 3 and 5, the bypass passage 39 is disposed so as to bypass all of the plurality of high-pressure feed water heaters 15a, 15b, 15c. Further, the at least one bypass valve 41 includes two three-way valves 41a, 41b disposed on the upstream branch point and the downstream branch point between the bypass passage 39 and the feed water path 27.

With the above configuration, as the control device 43 switches the three-way valves 41a, 41b, all the water flowing through the feed water path 27 can flow through all of the plurality of high-pressure feed water heaters 15a, 15b, 15c, or bypass all of the plurality of high-pressure feed water heaters 15a, 15b, 15c.

In some embodiments, as shown in FIG. 4, the bypass passage 39 includes a first bypass passage 39a capable of bypassing the first high-pressure feed water heater 15a, a second bypass passage 39b capable of bypassing the second high-pressure feed water heater 15b, and a third bypass passage 39c capable of bypassing the third high-pressure feed water heater 15c. The downstream side of the first bypass passage 39a and the upstream side of the second bypass passage 39b may be overlapped. The downstream side of the second bypass passage 39b and the upstream side of the third bypass passage 39c may be overlapped.

Further, the at least one bypass valve 41 includes four three-way valves 41c, 41d, 41e, 41f, disposed on the upstream branch point and the downstream branch point between the feed water path 27 and each of the first bypass passage 39a, the second bypass passage 39b, and the third bypass passage 39c.

With the above configuration, as the control device 43 switches the three-way valves 41c, 41d, 41e, 41f, all the water flowing through the feed water path 27 can flow through all or a part of the plurality of high-pressure feed water heaters 15a, 15b, 15c, or bypass all of the plurality of high-pressure feed water heaters 15a, 15b, 15c. As described above, by allowing the water flowing through the feed water path 27 to flow through only a part of the plurality of high-pressure feed water heaters 15a, 15b, 15c, it is possible to fine-adjust the temperature of water supplied to the internal heat exchanger 23. As a result, it is possible to adjust the temperature of exhaust gas at the catalyst device 17 appropriately, and remove metallic mercury from exhaust gas efficiently.

In some embodiments, as shown in FIGS. 2, 3, and 4, the exhaust gas temperature adjustment device 21 includes an exhaust gas temperature sensor 37, at least one extraction valve 45, and a control device 43.

The exhaust gas temperature sensor 37 is the same as the one described in the above embodiment.

The at least one extraction valve 45 is capable of adjusting the flow rate of steam extracted from the at least one steam turbine 5 in the at least one extraction passage 47 extending between the at least one steam turbine 5 and the at least one high-pressure feed water heater 15.

For instance, as shown in FIGS. 2, 3, and 4, the at least one extraction passage 47 includes the first extraction passage 47a, the second extraction passage 47b, and the third extraction passage 47c, extending between the high-pressure turbine 5a and the first high-pressure feed water heater 15a, the second high-pressure feed water heater 15b, and the third high-pressure feed water heater 15c, respectively.

Further, the at least one extraction valve 45 includes the first extraction valve 45a, the second extraction valve 45b, and the third extraction valve 45c, disposed in the first extraction passage 47a, the second extraction passage 47b, and the third extraction passage 47c, respectively. The first extraction valve 45a, the second extraction valve 45b, and the third extraction valve 45c are capable of adjusting the flow rate of the steam S4, S5, S6 of corresponding one of the first extraction passage 47a, the second extraction passage 47b, and the third extraction passage 47c, respectively.

The control device 43 includes a computer, for instance, and is configured to adjust the opening degree of the at least one extraction valve 45 on the basis of the measurement result of the exhaust gas temperature sensor 37. For instance, the control device 43 is capable of adjusting the flow rate of steam supplied to at least one of the first high-pressure feed water heater 15a, the second high-pressure feed water heater 15b, or the third high-pressure feed water heater 15c, by adjusting at least one of the first extraction valve 45a, the second extraction valve 45b, or the third extraction valve 45c.

Thus, with the above configuration, the exhaust gas temperature adjustment device 21 adjusts the opening degree of the extraction valve 45 on the basis of the measurement result of the exhaust gas temperature sensor 37, and thereby it is possible to adjust the temperature of exhaust gas at the catalyst device 17 appropriately, and remove metallic mercury from exhaust gas efficiently, with a simplified configuration.

The control device 43 may be configured to adjust the opening degree of both of the at least one bypass valve 41 and the at least one extraction valve on the basis of the measurement result of the exhaust gas temperature sensor 37, or may be configured to adjust the opening degree of either one of the at least one bypass valve 41 or the at least one extraction valve. In a case where the control device 43 is configured to adjust only the opening degree of the extraction valve 45, the bypass passage 39 and the bypass valve 41 may be omitted.

In some embodiments, fuel supplied to the boiler 3 as fuel is lignite, and the exhaust gas temperature adjustment device 21 is configured to adjust the temperature of exhaust gas at the catalyst device 17 to be not higher than 420° C., or more preferably, not higher than 400° C.

Of the thermal power generation system, particularly in a coal burning thermal power generation system that uses lignite, the heat exchange rate at the internal heat exchanger of the boiler tends to decrease with time, which leads to a gradual increase in the exhaust gas temperature. Thus, in the coal burning thermal power generation system using lignite, the temperature of exhaust gas at the catalyst device (denitration device) exceeds 420° C. as the operation time advances. The chemical equilibrium between metallic mercury and mercuric oxide has temperature dependency. If the temperature of exhaust gas exceeds 420° C., the chemical equilibrium changes and the proportion of metallic mercury to the entire mercury increases. Furthermore, metallic mercury has a higher vapor pressure than that of mercuric oxide. An increase in the proportion of metallic mercury leads to deterioration of the efficiency of removing mercury from exhaust gas.

In this regard, with the thermal power generation system having the above configuration, the exhaust gas temperature adjustment device 21 is configured to adjust the temperature of exhaust gas at the catalyst device 17 to 420° C. or below, and thus it is possible to maintain the chemical equilibrium between metallic mercury and mercuric oxide in a state where the proportion of metallic mercury is relatively small, which makes it possible to remove mercury from exhaust gas reliably and efficiently.

In some embodiments, the exhaust gas temperature adjustment device 21 is configured to adjust the temperature of exhaust gas at the catalyst device 17 to be not higher than 400° C.

With the above configuration, the exhaust gas temperature adjustment device 21 is configured to adjust the temperature of exhaust gas at the catalyst device 17 to 400° C. or below, and thus it is possible to maintain the chemical equilibrium between metallic mercury and mercuric oxide in a state where the proportion of metallic mercury is relatively small, and to remove mercury from exhaust gas reliably and efficiently.

In some embodiments, the exhaust gas temperature adjustment device 21 is configured to adjust the temperature of exhaust gas at the catalyst device 17 to be not lower than 290° C., or more preferably, not lower than 320° C.

The reduction reaction of nitrogen oxide proceeds smoothly when the temperature of exhaust gas at the catalyst device 17 is 290° C. or higher, or more preferably, 320° C. or higher. In contrast, if the temperature of exhaust gas is lower than 320° C., depending on the concentration of SOx in exhaust gas or concentration of $NH_3$ injected to achieve the necessary denitration function, acidic ammonium sulfate may be deposited on the catalyst, which may cause reduction of the activity of the catalyst. When the activity of the catalyst decreases, the oxidization reaction of mercury may fail to proceed smoothly.

In this regard, with the thermal power generation system 1 having the above configuration, the exhaust gas temperature adjustment device 21 is configured to adjust the temperature of exhaust gas at the catalyst device 17 to 290° C. or higher, or preferably, 320° C. or higher, and thus it is possible to remove nitrogen oxide from exhaust gas reliably and efficiently, and remove metallic mercury from exhaust gas reliably and efficiently.

In some embodiments, the exhaust gas temperature adjustment device 21 is configured to adjust the temperature of exhaust gas at the catalyst device 17 to be not lower than 290° C. and not higher than 420° C.

In some embodiments, the exhaust gas temperature adjustment device 21 is configured to adjust the temperature of exhaust gas at the catalyst device 17 to be not lower than 320° C. and not higher than 420° C.

In some embodiments, the exhaust gas temperature adjustment device 21 is configured to adjust the temperature of exhaust gas at the catalyst device 17 to be not lower than 320° C. and not higher than 400° C.

With this configuration, by adjusting the temperature of exhaust gas to 400° C. or below, it is possible to maintain the chemical equilibrium between metallic mercury and mercuric oxide in a state where the proportion of metallic mercury is relatively even smaller, and to remove mercury from exhaust gas even more reliably and efficiently.

In some embodiments, the exhaust gas temperature adjustment device 21 is configured to adjust the temperature of exhaust gas at the catalyst device 17 to be not lower than 350° C. and not higher than 400° C.

With this configuration, by adjusting the temperature of exhaust gas to 350° C. or higher, it is possible to suppress deposition of acidic ammonium sulfate even more reliably, and remove nitrogen oxide from exhaust gas reliably and efficiently, while removing metallic mercury from exhaust gas reliably and efficiently.

In some embodiments, the exhaust gas temperature adjustment device 21 is configured to adjust the temperature of exhaust gas at the catalyst device 17 to be not lower than 290° C. and not higher than 420° C., if the load factor of the boiler 3 is not smaller than 50% and not greater than 100%.

If the load factor of the boiler 3 is not smaller than 50% and not greater than 100%, the temperature of exhaust gas at the catalyst device 17 is likely to become high. In this regard, with the above configuration, even if the load factor of the boiler 3 is not smaller than 50% and not greater than 100%, the temperature of exhaust gas at the catalyst device 17 can be adjusted to be not lower than 290° C. and not higher than 420° C.

In some embodiments, the exhaust gas temperature adjustment device 21 is configured to adjust the temperature of exhaust gas at the catalyst device 17 to be not lower than 320° C. and not higher than 400° C., if the load factor of the boiler 3 is not smaller than 50% and not greater than 100%.

In some embodiments, the exhaust gas temperature adjustment device 21 is configured to adjust the temperature of exhaust gas at the catalyst device 17 to be not lower than 350° C. and not higher than 400° C., if the load factor of the boiler 3 is not smaller than 50% and not greater than 100%.

In some embodiments, the exhaust gas temperature adjustment device 21 is configured to adjust the temperature of exhaust gas at the catalyst device 17 to be not lower than 290° C. and not higher than 420° C., if the load factor of the boiler 3 is not smaller than 25% and not greater than 50%.

If the load factor of the boiler 3 is not smaller than 25% and not greater than 50%, the temperature of exhaust gas at the catalyst device 17 is likely to become low. In this regard, with the above configuration, even if the load factor of the boiler 3 is not smaller than 25% and not greater than 50%, the temperature of exhaust gas at the catalyst device 17 can be adjusted to be not lower than 290° C. and not higher than 420° C.

In some embodiments, the exhaust gas temperature adjustment device 21 is configured to adjust the temperature of exhaust gas at the catalyst device 17 to be not lower than 320° C. and not higher than 400° C., if the load factor of the boiler 3 is not smaller than 25% and not greater than 100%.

In some embodiments, the exhaust gas temperature adjustment device 21 is configured to adjust the temperature of exhaust gas at the catalyst device 17 to be not lower than 350° C. and not higher than 400° C., if the load factor of the boiler 3 is not smaller than 25% and not greater than 100%.

In some embodiments, the exhaust gas temperature adjustment device 21 is configured such that all of the high-pressure feed water heaters 15 heat water during startup of the boiler 3.

With the above configuration, during startup of the boiler 3, water is heater by all of the high-pressure feed water heaters 15, and thereby it is possible to increase the temperature of water to be supplied to the internal heat exchanger 23 quickly, and increase the temperature of exhaust gas at the catalyst device 17 quickly.

In some embodiments, as shown in FIGS. 3 and 4, the exhaust gas temperature adjustment device 21 includes a feed water temperature sensor 49 capable of measuring the temperature of water (feed water) to be supplied to the at least one internal heat exchanger 23 from the at least one high-pressure feed water heater 15. The control device 43 is capable of adjusting the temperature of exhaust gas at the catalyst device 17 by adjusting heating of water by the at least one high-pressure feed water heater 15, on the basis of the temperature of exhaust gas at the catalyst device 17 measured by the exhaust gas temperature sensor 37 and the temperature of feed water to the internal heat exchanger 23 measured by the feed water temperature sensor 49.

With the above configuration, the exhaust gas temperature adjustment device 21 adjusts heating of water by the at least one high-pressure feed water heater 15 on the basis of, in addition to the temperature of exhaust gas at the catalyst device 17, the temperature of feed water to the internal heat exchanger 23 measured by the feed water temperature sensor 49, and thereby it is possible to adjust the temperature of exhaust gas at the catalyst device 17 more precisely.

Further, the feed water temperature sensor 49 is disposed in a section of the feed water path 27, which extends between the boiler 3 and the high-pressure feed water heater 15.

In some embodiments, the exhaust gas temperature adjustment device 21 is configured to adjust the temperature of feed water to the internal heat exchanger 23 to be not lower than 130° C. and not higher than 300° C.

In some embodiments, the exhaust gas temperature adjustment device 21 is configured to adjust the temperature of exhaust gas at the catalyst device 17 to be not lower than 290° C. and not higher than 420° C., and the temperature of feed water to the internal heat exchanger 23 to be not lower than 130° C. and not higher than 300° C., if the load factor of the boiler 3 is not smaller than 25% and not greater than 50%, and if the load factor of the boiler 3 is not smaller than 50% and not greater than 100%.

In some embodiments, the exhaust gas temperature adjustment device 21 is configured to adjust the temperature of exhaust gas at the catalyst device 17 to be not lower than 320° C. and not higher than 400° C., and the temperature of feed water to the internal heat exchanger 23 to be not lower than 130° C. and not higher than 300° C., if the load factor of the boiler 3 is not smaller than 25% and not greater than 50%, and if the load factor of the boiler 3 is not smaller than 50% and not greater than 100%.

In some embodiments, the exhaust gas temperature adjustment device 21 is configured to adjust the temperature of exhaust gas at the catalyst device 17 to not lower than 350° C. and not higher than 400° C., and the temperature of feed water to the internal heat exchanger 23 to not lower than 130° C. and not higher than 300° C., if the load factor of the boiler 3 is not smaller than 25% and not greater than 50%, and not smaller than 50% and not greater than 100%.

In some embodiments, as shown in FIG. 1, the thermal power generation system 1A, 1E further includes an oxidizing agent supply device 51. The oxidizing agent supply device 51 is capable of supplying, to the catalyst device 17, halogen used in oxidation reaction of metallic mercury.

With the above configuration, even if the concentration of hydrogen chloride in exhaust gas is low, by supplying halogen to the catalyst device 17 with the oxidizing agent supply device 51, it is possible to react the metallic mercury with the halogen to produce mercuric oxide, and remove mercury from exhaust gas reliably and efficiently.

In some embodiments, the oxidizing agent supply device 51 is configured to be capable of supplying, to the upstream side of the catalyst device 17, an aqueous solution of ammonium halide, for example ammonium chloride, as an oxidizing agent.

With the above configuration, it is possible to supply ammonium to be used in reduction reaction of nitrogen oxide to the catalyst device 17 at the same time.

Further, besides ammonium chloride, ammonium bromide and ammonium iodide can be also used as an ammonium halide.

In some embodiments, as shown in FIG. 5, the thermal power generation system 1A, 1E further includes a mercury concentration sensor 53 and an oxidizing agent supply amount regulating valve 55.

The mercury concentration sensor 53 is, for instance, disposed in the exhaust path 29 and positioned downstream of the catalyst device 17, being capable of measuring the mercury concentration of exhaust gas. The oxidizing agent supply amount regulating valve 55 is disposed in the supply passage of oxidizing agent to the catalyst device 17, and is capable of regulating the flow rate of oxidizing agent to be supplied to the catalyst device 17. Further, the control device 43 may be used, or another control device may be provided, to enable regulation of the flow rate of oxidizing agent to be supplied to the catalyst device 17, on the basis of the measurement result of the metallic mercury concentration and oxidized metallic concentration of the mercury concentration sensor 53.

With the above configuration, by measuring the mercury concentration and adjusting the supply amount of oxidizing agent on the basis of the measurement result of the metallic mercury concentration and mercuric oxide concentration, it is possible to react the metallic mercury with halogen reliably, and remove mercury from exhaust gas reliably and efficiently.

Figure 6:
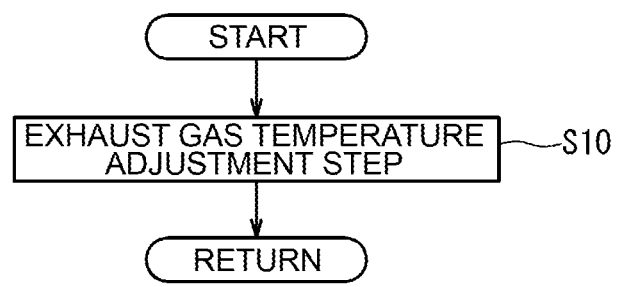
FIG. 6 is a schematic flow diagram of a method of controlling a thermal power generation system according to an embodiment of the present invention.

FIG. 6 is a flow chart showing a schematic process of a method of controlling the thermal power generation system 1 according to an embodiment of the present invention.

As shown in FIG. 6, the control method of the thermal power generation system 1 includes an exhaust gas temperature adjustment step S10. Then, in the exhaust gas temperature adjustment step S10, the temperature of exhaust gas at the catalyst device 17 is adjusted by adjusting heating of water by the at least one high-pressure feed water heater 15.

According to the above method of controlling the thermal power generation system 1 having the above configuration, it is possible to adjust the temperature of exhaust gas at the catalyst device 17 by adjusting heating of water with the at least one high-pressure feed water heater 15. Thus, in the above configuration, it is possible to adjust the temperature of exhaust gas at the catalyst device 17, and remove metallic mercury from exhaust gas efficiently with a simplified configuration.

In some embodiments, in the exhaust gas temperature adjustment step S10, heating of water by the high-pressure feed water heater 15 is adjusted so that the temperature of exhaust gas at the catalyst device 17 becomes not lower than 290° C. and not higher than 420° C.

In some embodiments, in the exhaust gas temperature adjustment step S10, heating of water by the high-pressure feed water heater 15 is adjusted so that the temperature of exhaust gas at the catalyst device 17 becomes not lower than 320° C. and not higher than 400° C.

In some embodiments, in the exhaust gas temperature adjustment step S10, heating of water by the high-pressure feed water heater 15 is adjusted so that the temperature of exhaust gas at the catalyst device 17 becomes not lower than 350° C. and not higher than 400° C.

Embodiments of the present invention were described in detail above, but the present invention is not limited thereto, and various amendments and modifications may be implemented.

For instance, as a modification, a bypass duct 100 which brings the upstream side and the downstream side of the economizer 23a into communication may be provided, the bypass duct 100 being controlled by a bypass control valve, which is composed of an economizer bypass damper 101 disposed on the bypass duct 100 and an economizer outlet damper 102 disposed on an outlet pipe of an economizer 23a, that is well known in the art from JPS61-200838, and allowing a part of exhaust gas at the inlet of the economizer 23a to bypass the economizer 23a and merge at the outlet of the economizer 23a to flow to the catalyst device 17, so that the exhaust gas temperature at the catalyst device 17 is controlled to be in the above described temperature range, when the exhaust gas temperature itself is low during startup of the boiler 3 or during part load (low load) of the boiler 3 of 50% or less.

Further, for instance, as shown in FIG. 1, the thermal power generation system 1 may further include a deaerator 57 for removing gas contained in water. In this case, the deaerator 57 is positioned between the low-pressure feed water heater 11 and the high-pressure feed water pump 13, and is interposed in the feed water path 27. Further, a part (steam S7) of steam discharged from the intermediate-pressure turbine 5b may be supplied to the deaerator 57.

Further, for instance, the thermal power generation system 1 may further include a condensate pump 59 for pumping water condensed by the condenser 9 to the low-pressure feed water heater 11. In this case, the condensate pump 59 may be positioned between the low-pressure feed water heater 11 and the high-pressure feed water pump 13, and interposed in the feed water path 27.

Furthermore, for instance, the thermal power generation system 1 may include an air heater 61 for heating air to be supplied to the boiler 3. The air heater 61 is positioned between the catalyst device 17 and the mercuric oxide removing device 19 and disposed in the exhaust path 29, and is capable of heating air to be supplied to the boiler 3 with a blower 63 through heat exchange with exhaust gas.

Further, for instance, in the above described embodiment, the thermal power generation system 1 is a coal thermal power generation system configured to burn coal as a fuel. However, the fuel is not limited to coal, and may be heavy oil or the like.

DESCRIPTION OF REFERENCE NUMERALS 1A, 1B, 1C, 1D, 1E Thermal power generation system
3 Boiler
5 Steam turbine
5a High-pressure turbine
5b Intermediate-pressure turbine
5c Low-pressure turbine
7 Generator
9 Condenser
11 Low-pressure feed water heater
11a First low-pressure feed water heater
11b Second low-pressure feed water heater
11c Third low-pressure feed water heater
13 High-pressure feed water pump
15 High-pressure feed water heater
15a First high-pressure feed water heater
15b Second high-pressure feed water heater
15c Third high-pressure feed water heater
17 Catalyst device
19 Mercuric oxide removing device
21 Exhaust gas temperature adjustment device
23 Internal heat exchanger
23a Economizer
23b Evaporator
23c Super-heater
23d Re-heater
25 Circulation passage
27 Feed water path
29 Exhaust path
31 Denitration device
33 Dust collector
35 Desulfurization apparatus
36 Stack
37 Exhaust gas temperature sensor
39 Bypass passage
39a First bypass passage
39b Second bypass passage
39c Third bypass passage
41 Bypass valve
41a, 41b, 41c, 41d, 41e, 41f Three-way valve
43 Control device
45 Extraction valve
45a First extraction valve
45b Second extraction valve
45c Third extraction valve
47 Extraction passage
47a First extraction passage
47b Second extraction passage
47c Third extraction passage
49 Feed water temperature sensor
51 Oxidizing agent supply device
53 Mercury concentration sensor
55 Oxidizing agent supply amount regulating valve
57 Deaerator
59 Condensate pump
61 Air heater
63 Blower

The invention claimed is:

1. A thermal power generation system, comprising:
a coal burning or oil burning boiler including at least one internal heat exchanger that includes an economizer being disposed in a circulation passage through which water is circulatable, and being capable of generating steam through heat exchange between the water and exhaust gas produced by burning coal or heavily oil as a fuel;
at least one steam turbine being disposed in the circulation passage and being capable of outputting power by utilizing the steam;

a generator capable of generating electric power by utilizing the power outputted from the steam turbine;

a condenser capable of condensing the steam discharged from the steam turbine;

at least one low-pressure feed water heater being disposed in a feed water path forming a part of the circulation passage, extending from the condenser to the at least one internal heat exchanger, and being capable of heating the water condensed by the condenser by utilizing steam extracted from the at least one steam turbine;

a high-pressure feed water pump being disposed in the feed water path of the circulation passage so as to be positioned downstream of the at least one low-pressure feed water heater, and being capable of increasing a pressure of the water heated by the at least one low-pressure feed water heater and pumping the water;

at least one high-pressure feed water heater being disposed in the feed water path of the circulation passage so as to be positioned between the high-pressure feed water pump and the at least one internal heat exchanger, and being capable of heating the water pumped by the high-pressure feed water pump by utilizing steam extracted from the at least one steam turbine;

a catalyst device being disposed in an exhaust path of the exhaust gas extending from the boiler, and including at least one kind of catalyst capable of promoting reduction reaction of nitrogen oxide and oxidation reaction of metallic mercury, the nitrogen oxide and the metallic mercury both being contained in the exhaust gas;

at least one mercuric oxide removing device being disposed in the exhaust path so as to be positioned downstream of the catalyst device, and being capable of removing mercuric oxide produced by the oxidation reaction of the metallic mercury from the exhaust gas;

an exhaust gas temperature adjustment device capable of adjusting a temperature of the exhaust gas at the catalyst device to be not higher than 420° C., by adjusting heating of the water by the at least one high-pressure feed water heater; and a bypass duct which brings a flue gas duct of an upstream side of the economizer and a flue gas duct of a downstream side of the economizer into communication, wherein the bypass duct allows at least a part of the exhaust gas to bypass the economizer during startup of the boiler or during part load of the boiler and the exhaust gas is prevented from passing through the bypass duct while not in starting up of the boiler nor in part load of the boiler after starting the boiler, and wherein the exhaust gas temperature adjustment device includes:

an exhaust gas temperature sensor capable of measuring the temperature of the exhaust gas at the catalyst device;

at least one extraction valve disposed in at least one extraction passage extending between the at least one steam turbine and the at least one high-pressure feed water heater, and being capable of adjusting a flow rate of steam extracted from the at least one steam turbine; and a control device adjusting an opening degree of the at least one extraction valve on the basis of a measurement result of the exhaust gas temperature sensor.

2. The thermal power generation system according to claim 1, wherein the exhaust gas temperature adjustment device includes:

at least one bypass passage disposed parallel to the feed water path so as to be capable of bypassing at least one of the at least one high-pressure feed water heater;

at least one bypass valve capable of adjusting a flow rate of the water in the at least one bypass passage; and a control device adjusting an opening degree of the at least one bypass valve on the basis of a measurement result of the exhaust gas temperature sensor.

3. The thermal power generation system according to claim 1, wherein the fuel is lignite.

4. The thermal power generation system according to claim 1, wherein the exhaust gas temperature adjustment device adjusts the temperature of the exhaust gas at the catalyst device to be not lower than 290° C.

5. The thermal power generation system according to claim 1, further comprising an oxidizing agent supply device capable of supplying halogen to be used in the oxidation reaction of the metallic mercury to the catalyst device.

6. A method of controlling a thermal power generation system according to claim 1, wherein the method comprises:

adjusting a temperature of the exhaust gas at the catalyst device to be not higher than 420° C. by the exhaust gas temperature adjustment device adjusting heating of the water by the at least one high-pressure feed water heater; and allowing at least a part of the exhaust gas to bypass the economizer by the bypass duct during startup of the boiler or during part load of the boiler and preventing the exhaust gas from passing through the bypass duct while not in starting up of the boiler, nor in part load of the boiler after staring the boiler.

7. A thermal power generation system comprising:

a coal burning or oil burning boiler including at least one internal heat exchanger that includes an economizer being disposed in a circulation passage through which water is circulatable, and being capable of generating steam through heat exchange between the water and exhaust gas produced by burning coal or heavily oil as a fuel;

at least one steam turbine being disposed in the circulation passage and being capable of outputting power by utilizing the steam;

a generator capable of generating electric power by utilizing the power outputted from the steam turbine;

a condenser capable of condensing the steam discharged from the steam turbine;

at least one low-pressure feed water heater being disposed in a feed water path forming a part of the circulation passage, extending from the condenser to the at least one internal heat exchanger, and being capable of heating the water condensed by the condenser by utilizing steam extracted from the at least one steam turbine;

a high-pressure feed water pump being disposed in the feed water path of the circulation passage so as to be positioned downstream of the at least one low-pressure feed water heater, and being capable of increasing a pressure of the water heated by the at least one low-pressure feed water heater and pumping the water;

at least one high-pressure feed water heater being disposed in the feed water path of the circulation passage so as to be positioned between the high-pressure feed water pump and the at least one internal heat exchanger, and being capable of heating the water pumped by the high-pressure feed water pump by utilizing steam extracted from the at least one steam turbine;

a catalyst device being disposed in an exhaust path of the exhaust gas extending from the boiler, and including at least one kind of catalyst capable of promoting reduction reaction of nitrogen oxide and oxidation reaction of metallic mercury, the nitrogen oxide and the metallic mercury both being contained in the exhaust gas;

at least one mercuric oxide removing device being disposed in the exhaust path so as to be positioned downstream of the catalyst device, and being capable of removing mercuric oxide produced by the oxidation reaction of the metallic mercury from the exhaust gas;

an exhaust gas temperature adjustment device capable of adjusting a temperature of the exhaust gas at the catalyst device to be not higher than 420° C., by adjusting heating of the water by the at least one high-pressure feed water heater; and a bypass duct which brings a flue gas duct of an upstream side of the economizer and a flue gas duct of a downstream side of the economizer into communication, wherein the bypass duct allows at least a part of the exhaust gas to bypass the economizer during startup of the boiler or during part load of the boiler and the exhaust gas is prevented from passing through the bypass duct while not in starting up of the boiler nor in part load of the boiler after starting the boiler, wherein the exhaust gas temperature adjustment device comprises:

an exhaust gas temperature sensor capable of measuring the temperature of the exhaust gas at the catalyst device; and a feed water temperature sensor capable of measuring the temperature of the water to be supplied to the at least one internal heat exchanger, and wherein the exhaust gas temperature adjustment device adjusts heating of the water by the at least one high-pressure feed water heater on the basis of the detecting results of the exhaust gas temperature sensor and the feed water temperature sensor.

* * * * *